United States Patent
Parthasarathy et al.

(10) Patent No.: US 10,853,006 B2
(45) Date of Patent: Dec. 1, 2020

(54) PRINT JOB PRINTING BASED ON HUMAN VOICE ACTIVITY DETECTED IN PROXIMITY TO PRINTING DEVICE

(71) Applicant: HEWLETT-PACKARD DEVELOPMENT COMPANY, L.P., Spring, TX (US)

(72) Inventors: Niraj Parthasarathy, Vancouver, WA (US); Corey Alvin Charlton, Vancouver, WA (US); Tyson James Larimer, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/603,826

(22) PCT Filed: Sep. 14, 2017

(86) PCT No.: PCT/US2017/051592
§ 371 (c)(1),
(2) Date: Oct. 8, 2019

(87) PCT Pub. No.: WO2019/055020
PCT Pub. Date: Mar. 21, 2019

(65) Prior Publication Data
US 2020/0133594 A1    Apr. 30, 2020

(51) Int. Cl.
*G06F 3/12* (2006.01)
*G10L 17/00* (2013.01)

(52) U.S. Cl.
CPC .......... *G06F 3/1222* (2013.01); *G06F 3/1238* (2013.01); *G10L 17/00* (2013.01)

(58) Field of Classification Search
CPC ...... G06F 3/1222; G06F 3/1238; G06F 3/167; G10L 17/005
See application file for complete search history.

(56) References Cited

U.S. PATENT DOCUMENTS

| | | | |
|---|---|---|---|
| 6,253,184 B1 * | 6/2001 | Ruppert | G03G 15/5016 704/272 |
| 6,862,583 B1 | 3/2005 | Mazzagatte et al. | |
| 7,187,462 B2 | 3/2007 | Oakeson et al. | |
| 7,620,177 B2 | 11/2009 | Ibrahim et al. | |
| 7,791,747 B2 * | 9/2010 | Roksz | G06F 21/608 358/1.14 |
| 8,264,716 B2 | 9/2012 | Ola et al. | |
| 8,928,906 B2 | 1/2015 | Mykins et al. | |
| 9,613,303 B2 * | 4/2017 | Tredoux | G06K 15/4095 |
| 2001/0025348 A1 * | 9/2001 | Takaragi | G06Q 20/3674 726/32 |
| 2003/0202100 A1 * | 10/2003 | Prenn | H04N 7/183 348/155 |

(Continued)

FOREIGN PATENT DOCUMENTS

WO    WO-2017039648 A1 *    3/2017    ............. G06F 3/167

*Primary Examiner* — Ted W Barnes
(74) *Attorney, Agent, or Firm* — Michael A Dryja

(57) ABSTRACT

Human voice activity in proximity to a printing device is detected. Printing of the print job is based on the detected human voice activity. For instance, starting of print job printing can be based on the detected human voice activity. Controlling of print job printing after printing has started can also be based on the detected human voice activity.

10 Claims, 2 Drawing Sheets

(56) References Cited

U.S. PATENT DOCUMENTS

| | | | | |
|---|---|---|---|---|
| 2004/0004735 A1* | 1/2004 | Oakeson | .............. | G06F 3/1226 |
| | | | | 358/1.15 |
| 2007/0061150 A1* | 3/2007 | Sawano | .............. | G10L 15/265 |
| | | | | 704/275 |
| 2013/0159720 A1* | 6/2013 | Gonser | .................. | G06F 21/32 |
| | | | | 713/176 |
| 2013/0297320 A1* | 11/2013 | Buser | ...................... | G10L 17/22 |
| | | | | 704/275 |
| 2014/0350932 A1* | 11/2014 | Grover | .................. | G10L 15/26 |
| | | | | 704/246 |
| 2015/0268911 A1* | 9/2015 | Sato | ...................... | G06F 3/1238 |
| | | | | 358/1.14 |
| 2015/0379986 A1* | 12/2015 | Golding | ................. | G10L 15/08 |
| | | | | 704/246 |
| 2016/0150124 A1* | 5/2016 | Panda | ................... | G06F 3/1204 |
| | | | | 358/1.13 |
| 2016/0260432 A1* | 9/2016 | Buser | .................... | B33Y 70/00 |
| 2016/0313974 A1* | 10/2016 | Chang | .................... | G06F 15/16 |
| 2017/0180606 A1* | 6/2017 | Zehler | .................. | H04N 1/4413 |
| 2017/0186426 A1* | 6/2017 | Su | ........................... | G10L 15/26 |
| 2017/0264765 A1* | 9/2017 | Nobutani | .............. | G06F 3/1292 |
| 2018/0239583 A1* | 8/2018 | Castells De Monet | ...................... | |
| | | | | G06F 3/1284 |

* cited by examiner

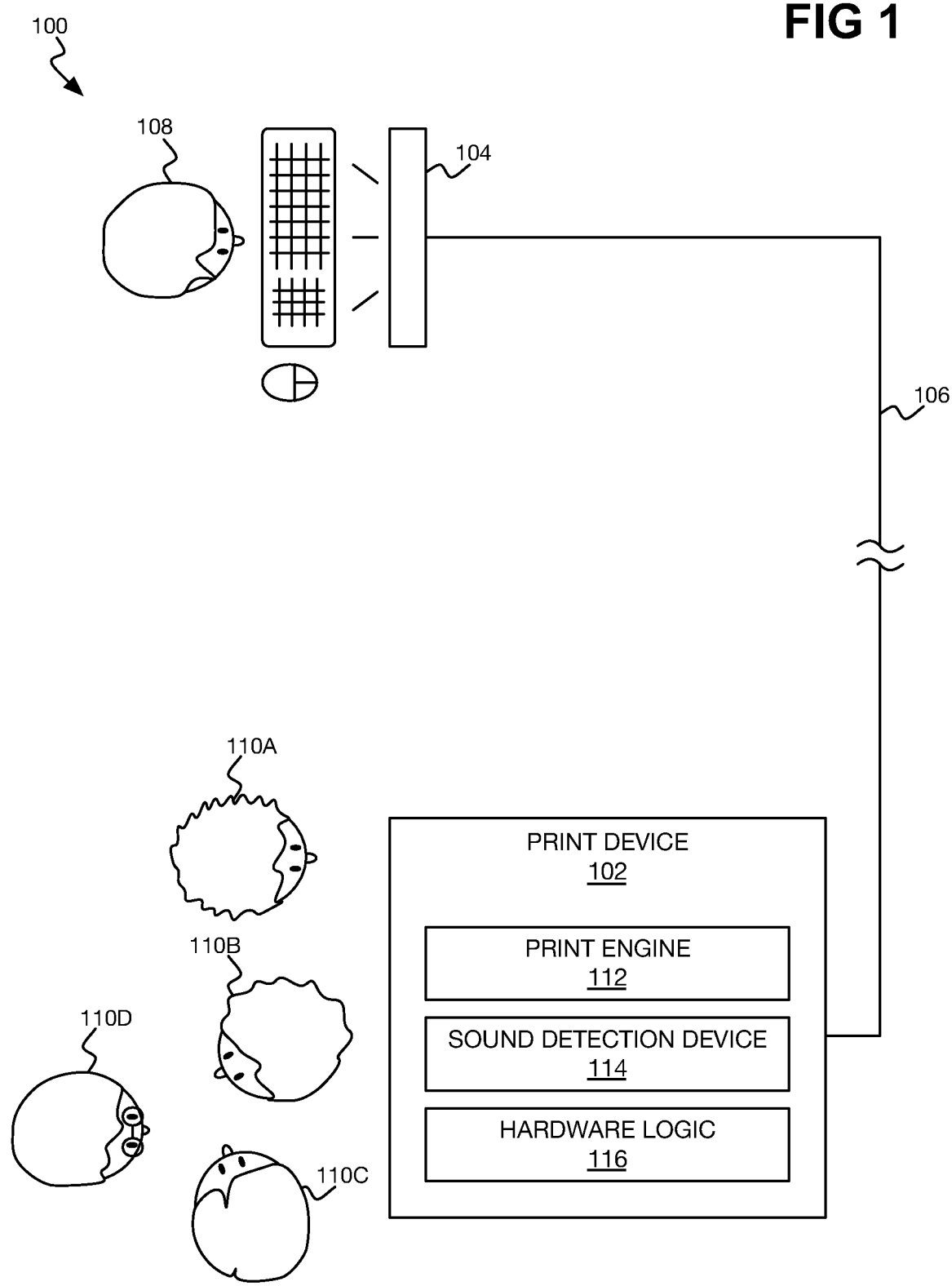

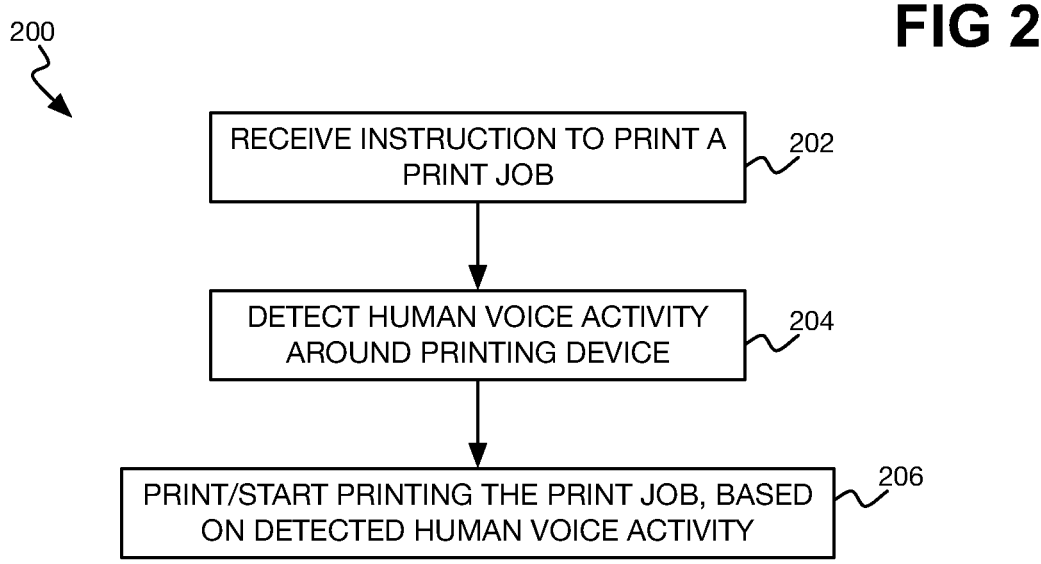
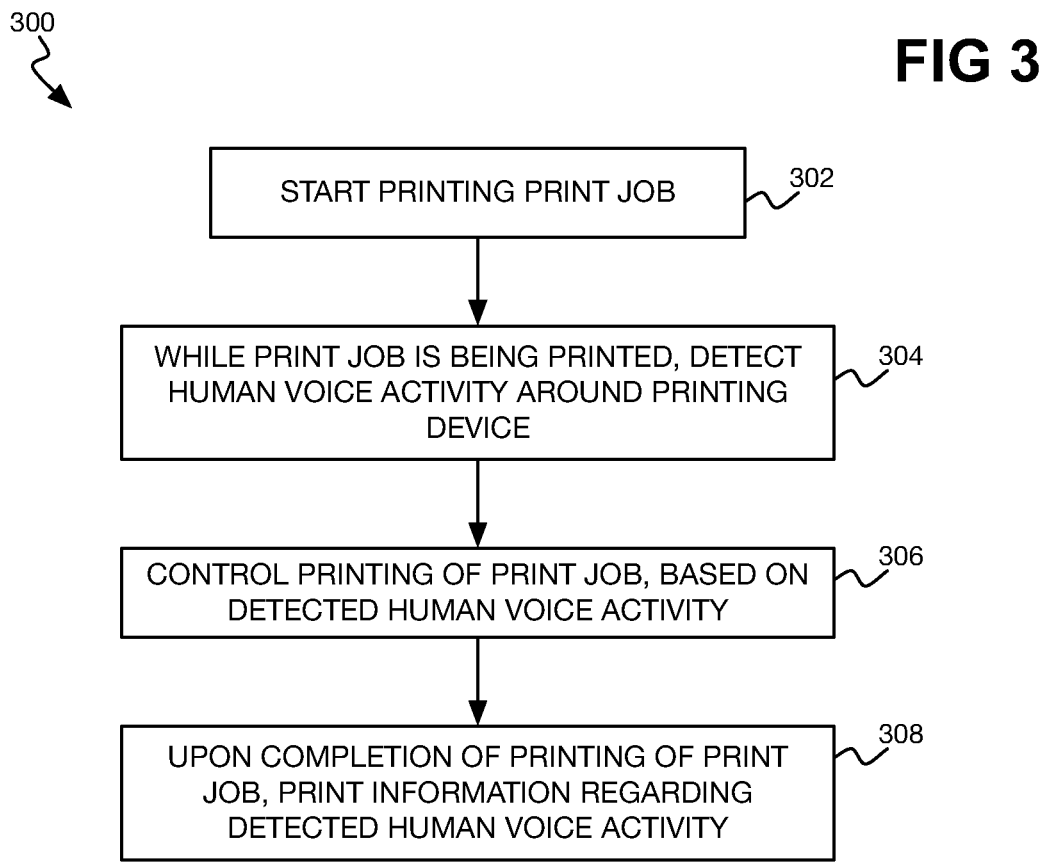

PRINT JOB PRINTING BASED ON HUMAN VOICE ACTIVITY DETECTED IN PROXIMITY TO PRINTING DEVICE

BACKGROUND

Printing devices like standalone printers and multifunction printing devices (MFDs) that include printing capability are commonly used to convert electronic information into hardcopy form. For example, users may print word processing documents, spreadsheets, and other electronic information onto print media like paper. In enterprise and other multiple-user environments, some users may have their own printing devices located near their computers, but more commonly multiple users share common printing devices that may be located throughout a workplace environment.

BRIEF DESCRIPTION OF THE DRAWINGS

FIG. 1 is a diagram of an example system including a printing device that prints a print job based on human voice activity detected in proximity to the printing device.

FIG. 2 is a flowchart of an example method for printing a print job based on human voice activity detected in proximity to a printing device.

FIG. 3 is a flowchart of another example method for printing a print job based on human voice activity detected in proximity to a printing device.

DETAILED DESCRIPTION

As noted in the background section, in many enterprise and other environments, multiple users share printing devices. Such sharing mitigates costs on the part of the organizations providing the printing devices to their employees, and further leverages the insight that at any given time, a particular user is unlikely to be engaging in printing. Therefore, a relatively small number of printing devices can support a relatively large number of users without causing the users to have to unduly wait for completion of their print jobs.

A potential drawback to printing device sharing, however, is that users do not have control over who has access to their print jobs once the print jobs have been printed and before the users are able to pick up the completed print jobs at the printing device. In most contexts this lack of control is acceptable, because users may typically generate print jobs that include information that is not overly sensitive; for example, other users within the same organization may be privy to the same information. Furthermore, users who on a regular basis generate print jobs that include sensitive information, such as human resources personnel, may be provided their own printing devices.

However, at times it is not uncommon for a typical user within an organization to have to generate a print job that includes sensitive information that the user may not wish other, unauthorized users even within the same organization to see. For example, a user may have been assigned to a project that is relatively secret within the organization, such that the user may not be permitted to share information regarding the project with his or her peers. In such cases, when a user has to generate a print job for output via a shared printing device, the user may have difficulty ensuring that the information is not compromised after completion of the print job and before the user picks up the print job.

Disclosed herein are techniques that can improve security surrounding print jobs output on shared printing devices. In these techniques, print job printing is based on human voice activity that is detected in proximity to a printing device. For example, a printing device may not start printing a print job until no human voice activity is detected near the device. As another example, a printing device may pause printing when human voice activity is detected, or when particular users are recognized based on the detected human voice activity.

An audit log may further be output as part of the print job. The audit log may indicate the number of distinct human voices—and hence the number of unique users—that were detected while the print job was being output. The audit log may include the identities of users who have been recognized based on these detected human voices. For each detected voice for which the identity of the corresponding user could not be recognized, the audit log may include a voiceprint in the form of a code like a two-dimensional barcode, so that this currently unknown user may potentially be identified later when further information is available.

FIG. 1 shows an example system 100. The system includes a printing device 102 and a computing device 104. The printing device 102 may be a standalone printer, an all-in-one (AIO) device having printing capability in addition to other capabilities like scanning, and another type of device that has printing capability. The computing device 104 may be a desktop or a laptop computer. The printing device 102 and the computing device 104 are communicatively connected to one another, such as over a network 106.

The location of printing device 102 may be sufficiently far away from the location of the computing device 104 that the printing device 102 is not within sight of a user 108 operating the computing device 104. Furthermore, the printing device 102's location may be sufficiently far away from the computing device 104's location that the user 108 is unable to hear sound at the location of the printing device 102. For example, the user 108 may be unable to hear the voices of other users 110A, 1106, 110C, and 110D, who are collectively referred to as the users 110, may be standing or otherwise temporarily located near the printing device 102.

Therefore, when the user 108 initiates a print job at the computing device 104 for printing on the printing device 102, the user 108 may be unable to discern whether other users 110 are currently congregating at or near the printing device 102. Furthermore, even if the user 108 is able to hear that other users 110 are near the printing device 102, once the user 108 initiates printing of the print job at the device 102, other users may walk up to or near the printing device 102 while the device 102 is printing the print job, and/or before the user 108 is able to walk to the printing device 102's location to pick up the completed print job. As such, if the printing device 102 is accessible by other users 110, the user 108 may not be able to ascertain whether any of the other users 110 glanced or viewed the print job while or after the print job was printed.

The printing device 102 includes a print engine 112, a sound detection device 114, and hardware logic 116. The print engine 112 can include those components of the printing device 102 that actually print a print job, such as one received from the computing device 104 over the network 106, on printable media like paper. For example, the print engine 112 may be an inkjet-printing engine, a laser-printing engine, or another type of print engine.

The sound detection device 114 can be a microphone or another type of sound detection device. The sound detection device 114 detects sound around the printing device 102. As such, the sound detection device can detect human voice activity near (i.e., in proximity to) the printing device 102, such as the voices of the users 110 who are currently congregating around the printing device 102. The users 110 may be waiting for their own print jobs to be completed, for instance, or may have ran into one another while walking past the printing device 102 and may have temporarily stopped to engaged in a conversation with each other.

The hardware logic 116 can include a processor that executes program instructions stored on a non-transitory computer-readable data storage medium. In this respect, the non-transitory computer-readable data storage medium, including the program instructions stored thereon, can encompass integrated circuits ICs like application-specific ICs (ASICs), field-programmable gate arrays (FPGAs), and so on. The hardware logic 116 prints, via the print engine 112, the print job generated at the computing device 104 based on the human voice activity that the sound detection device 114 has detected. For instance, the hardware logic 116 may start printing the print job based on such detected human voice activity, and/or control printing of the print job based on the detected human voice activity after printing of the print job has started.

FIG. 2 shows an example method 200 for printing a print job initiated at the computing device 104, by the printing device 102. The printing device 102 at least partially performs the method 200. In another implementation, the printing device 102 and the computing device 104 cooperatively perform the method 200. The method 200 may be implemented as program code stored on a non-transitory computer-readable data storage medium, which the printing device 102 and/or the computing device 104 executes.

The method 200 includes receiving an instruction to print a print job (202). For instance, in one implementation, part 202 can include the printing device 102 having received a print job along with an instruction to print the print job. In another implementation, part 204 can include the user initiating printing of a print job at the computing device 104, prior to the computing device 104 transmitting the print job to the printing device 102 over the network 106. As an example of the latter, a user may be operating an application program like a word processing program, and may initiate a print command at the application program to print the current document, which may bring up a print dialog box at which the user can specify the parameters governing printing of the document.

Prior to the printing device 102 printing the print job, the sound detection device 114 of the printing device 102 detects human voice activity around the printing device 102 (204), such as the voices of any users 110 that are currently congregating around the printing device 102. The printing device 102 then prints the print job, based on this detected human voice activity (206). More specifically, the printing device 102 can start printing of the print job based on the detected human voice activity.

For example, any detected sound for a period greater than a threshold length of time and at a volume greater than a threshold minimum level may be deemed as human voice activity, without performing any signal or sound processing on the detected sound to determine whether the sound does in fact include human voice. As another example, any detected sound may be subjected to signal or sound processing to determine whether the detected sound has characteristics corresponding to those of human voice activity, without necessarily identifying which users are speaking. As a variation to these examples, the printing device 102 may further include a non-sound detecting capability to assist in confirming whether detected sound includes human voice activity.

For instance, the printing device 102 may have Bluetooth wireless capability or another close-range wireless capability by which to wirelessly receive print jobs from users at or near the printing device 102, such as from their smartphones, tablets, and so on. The printing device 102 can be leveraged to assist in determining whether detected sound includes human voice activity. For example, if no signal or sound processing is performed on the detected sound, then such detected sound may be deemed as including human voice activity just if the printing device 102 is also able to detect the presence of another device having Bluetooth wireless capability nearby. As another example, if signal or sound processing is performed on the detected sound but does not yield a confidence level that the detected sound includes human voice activity by more than a threshold, then such detected sound may be deemed as including human voice activity just if the printing device 102 is also able to detect the presence of another device having Bluetooth wireless capability nearby.

The printing device 102 may therefore not start printing the print job until no human voice activity is detected in proximity to the printing device 102. In one implementation, for instance, the printing device 102 may receive the print job from the computing device 104, along with an instruction to begin printing the print job when no human voice activity is detected in proximity to the printing device 102. If human voice activity is detected, then the printing device 102 waits until the human voice activity stops before starting to print the print job.

In another implementation, the computing device 104 may send an instruction to the printing device 102 to inform the computing device 104 when no human voice activity is detected in proximity to the printing device 102. When the printing device 102 reports back to the computing device 104 that no human voice activity is currently detected near the printing device 102, the computing device 104 then responsively sends the print job to the printing device 102, which then begins to print the print job. As a variation, the computing device 104 may periodically poll the printing device 102 to determine whether the printing device 102 is currently detecting human voice activity in proximity to the device 102. The computing device 104 may then send the print job to the printing device 102 for printing when the device 102 reports back that no human voice activity is currently detected near the printing device 102.

The identity of each user whose voice is present within the detected human voice activity in proximity to the printing device 102 may also be detected. For example, the printing device 102 may perform such biometric analysis itself, may send the detected human voice activity to the computing device 104 for biometric analysis, or may send the detected human voice activity to a different computing device for biometric analysis. The printing device 102 may start printing the print job based on the determined identity of each user whose voice is present within the detected human voice activity.

For instance, the printing device 102 may not start printing the print job if the identity of any user whose voice is present within the detected human voice activity is unknown. Stated another way, if biometric analysis cannot identify everyone whose voice is present within the detected human voice activity, then the printing device 102 may wait to start printing of the print job. As another example, the printing device 102 may not start printing the print job if the voices of particular users are identified within the detected human voice activity, and/or if the voices of users other than particular users are identified within the detected human voice activity.

For instance, a print job may concern a project from a team of users including Bob Jones and Alice Smith. If the voices of users other than Bob Jones or Alice Smith are identified within the detected human voice activity near the printing device 102, then printing of the print job may not immediately begin. As another example, a print job may concern a particular user, Frank Hamilton. If the voice of Frank Hamilton is identified within the detected human voice activity, then printing of the print job may not immediately begin.

The detected human voice activity near the printing device 102 may thus dictate if the device 102 is to begin printing a print job. At the least granular level, if any human voice is detected, then the printing device 102 may not begin printing the print job. At a more granular level, biometric analysis may be employed on the detected human voice activity in proximity to the printing device 102, and whether printing of the print job begins controlled based on the users whose voices are identified within the detected human voice activity. Biometric analysis of the detected human voice activity near the printing device 102 may control starting the printing of a print job on the device 102 in other ways as well: for example, the number of unique voices within the detected human voice activity may be employed as a basis on which to decide whether to being printing a print job.

The user 108 who, at the computing device 104, initiates printing of the print job may configure how detected human voice activity in proximity to the printing device 102 controls when the printing device 102 starts printing the print job. For instance, within the print dialog box that is brought up when the user 108 initiates the print command within an application program running on the computing device 104, options corresponding to the examples described above may be presented. The user may be able to select that printing is not to start until no human voice activity is detected near the printing device 102, that printing is not to start if the voice of an unknown user is detected, that printing is not to start if the voice of a user not on a "white list" of users is detected, that printing is not to start if the voice of a user on a "black list" of users is detected, and so on.

FIG. 3 shows another example method 300 for printing a print job initiated at the computing device 104, by the printing device 102. The method 300 can be used in conjunction with the method 200 that has been described. Whereas the method 200 primarily focuses on when to start printing a print job based on detected human voice activity around the printing device 102, the method 300 focuses on controlling printing of the print job after printing has started. The printing device 102 can perform the method 300. Like the method 200, the method 300 may be implemented as program code stored on a non-transitory computer-readable data storage medium, which the printing device 102 in particular can execute.

The printing device 102 starts printing the print job (302). For instance, part 302 may be performed by executing the method 200 that has been described. While the printing job is being printed, the printing device 102 continually detects human voice activity in proximity to the device 102 (304). The printing device 102 controls printing of the print job as the print job is printed, based on the detected human voice activity (306).

The printing device 102 can detect human voice activity as has been described in relation to the method 200. When human voice activity is detected, the printing device 102 may momentarily pause printing, until human voice activity is no longer detected in proximity to the printing device, at which time the printing device 102 continues printing the print job. The printing device 102 may instead terminate printing, without completing the print job. In either such implementation, the users who are speaking may not be identified.

In another implementation, however, the printing device 102 may determine the identity of each user whose voice is present within the detected human voice activity in proximity to the printing device 102, as in the method 200. In such instance, the printing device 102 may pause or terminate printing based on the determined identities of the users whose voices are present within the detected human voice activity. For example, the printing device 102 may pause or terminate printing if every user whose voice is present within the detected human voice activity cannot be identified. As another example, the printing device 102 may pause or terminate printing if the voices of users other than particular users are identified within the detected human voice activity, or if the voices of particular users are identified within the detected human voice activity.

Upon completion of printing of the print job, the printing device 102 may print information regarding the human voice activity detected when printing was started and/or while the print job was being printed through completion (308). For instance, the printing device 102 may indicate whether human voice activity was detected while the device 102 was printing each page of the print job, on a page-by-page basis. As one example, when the printing device 102 was printing the first page, it may not have detected human voice activity; while the device 102 was printing the second through fourth pages, it may have detected human voice activity; and while the printing device 102 was printing the last, fifth page of the print job, it may again not have detected human voice activity. This information may therefore be printed on a separate media sheet once the print job has been finished.

The user 108 initiating the print job can thus assess whether confidential information included in the print job has been compromised based on this information. For example, the most sensitive information may be on page seven of the print job. If human voice activity is detected prior to page seven being printed, but no human voice activity is detected as page seven is being printed and thereafter, then the user 108 can reasonably conclude that the sensitive information on page seven has not been compromised during printing of the print job.

Other information regarding the detected human voice activity may also be printed at the completion of the print job. For example, the number of unique voices determined within the detected human voice activity may be printed, on a page-by-page basis. If the identity of a user whose voice is present within the detected human voice activity is determined, this information may also be printed, again on a page-by-page basis.

As noted above, the identities of some users whose voices are present within the detected human voice activity may not be able to be determined. For example, biometric information regarding these users—matching them to their identities—may not be available. In such instance, the printing device 102 may generate a voiceprint of the voice of each such unknown user, and print a representation of the voiceprint, such as in the form of a barcode. As new biometric information regarding users is subsequently obtained, this voiceprint may later be able to be successfully matched against such newly acquired biometric information to identify the currently unknown user. Therefore, the printed information regarding the identities of the users whose voices are present within the human voice activity may include at least the identity of each known user, and the voiceprint of each unknown user.

The user 108 at the computing device 104 who initiates printing of the print job may configure how detected human voice activity in proximity to the printing device 102 controls printing of the print job in the method 300 once printing commences, similar to as in the method 200. As such, within the print dialog box that is displayed when the user 108 initiates the print command within an application program running on the computing device 104, the user 108 may select from among options corresponding to the examples that have been described. The user may be able to specify whether printing should be paused or terminated, and the conditions dictating whether such pausing or printing of termination is to occur. These conditions can include the detection of any human voice activity near the printing device 102, the detection of the voice of a user on a "white list" of users, the detection of the voice of a user on a "black list" of users, and so on.

The user may also be able to specify the information regarding the detected human voice activity that should be printed on a media sheet once the print job has been completed. This information can include the identities of users whose voices were detected during printing, and the number of unique voices (i.e., users) detected during printing, regardless of whether the users of the unique voices are identifiable or not. The information can also include voiceprints of at least the unknown users whose voices are detected during printing, and can also include voiceprints of the known, identified users whose voices are detected during printing.

The techniques that have been described herein therefore leverage human voice activity detection in the proximity of a printing device as a way to detect whether confidential information contained in a print job has been potentially compromised during printing. A user may not be able to directly view the printing device while the user's print job is printed, and may not be able to hear what users are near the printing device during such printing. Nevertheless, the user can have a degree of confidence as to whether any users were near the printing device while the device printed the print job, as well as the identities of such users.

We claim:

1. A method comprising:
responsive to an instruction to print a print job using a printing device, detecting human voice activity in proximity to the printing device using a sound detection device associated with the printing device; and
in response to no human voice activity detected in proximity to the printing device, starting printing of the print job, using the printing device.

2. The method of claim 1, further comprising:
in response to any human voice activity detected in proximity to the printing device, waiting until no human voice activity is detected in proximity to the printing device before starting printing of the print job.

3. The method of claim 1, further comprising:
determining an identity of each user whose voice is present within the human voice activity detected in proximity to the printing device; and
starting printing of the print job, based on the determined identity of each user whose voice is present within the human voice activity.

4. The method of claim 1, further comprising:
upon completion of printing of the printing job, printing information regarding the human voice activity detected in proximity to the printing device.

5. A non-transitory computer-readable data storage medium storing program instructions executable by a printing device to:
start printing a print job using the printing device;
while the print job is being printed, detect human voice activity in proximity to the printing device using a sound detection device associated with the printing device;
determining an identity of each user whose voice is present within the human voice activity detected in proximity to the printing device; and
pausing printing of the print job, based on the determined identity of each user whose voice is present within the human voice activity.

6. The non-transitory computer-readable data storage medium of claim 5, wherein the printing device is further to:
upon completion of printing of the print job, print information regarding the human voice activity detected in proximity to the printing device.

7. The non-transitory computer-readable data storage medium of claim 6, wherein the printing device is to print the information regarding the human voice activity by:
determine a number of unique voices within the human voice activity,
wherein the printed information comprises the determined number of unique voices within the human voice activity.

8. The non-transitory computer-readable data storage medium of claim 6, wherein the printing device is to print the information regarding the human voice activity by:
determining an identity of each user whose voice is present within the human voice activity detected in proximity to the printing device,
wherein the printed information comprises:
the identity of each user whose voice is present within the human voice activity and whose determined identity is known; and
a voiceprint of the voice of each user whose voice is present within the human voice activity and whose determined identity is unknown.

9. A printing device comprising:
a print engine to print a print job;
a sound detection device to detect human voice activity in proximity to the printing device; and
hardware logic to one or more of:
start printing the print job based on the detected human voice activity;
control printing of the print job based on the detected human voice activity after printing of the print job has been started, by pausing printing of the print job based on one or more of:
whether any human voice activity is detected in proximity to the printing;
a determined number of unique voices within the detected human voice activity;
determined identities of users whose voices are present within the detected human voice activity.

10. The printing device of claim 9, wherein the hardware logic is to start printing the print job based on one or more of:
whether any human voice activity is detected in proximity to the printing;

a determined number of unique voices within the detected human voice activity;

determined identities of users whose voices are present within the detected human voice activity.

* * * * *